United States Patent
Bhavsar et al.

(10) Patent No.: US 9,763,045 B2
(45) Date of Patent: Sep. 12, 2017

(54) BASE STATION SELECTION FOR POSITIONING/LOCALIZATION BASED ON AN INDICATION OF CAPACITY

(71) Applicant: QUALCOMM Incorporated, San Diego, CA (US)

(72) Inventors: Vrajesh Bhavsar, Sunnyvale, CA (US); Yin Chen, Campbell, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/709,208

(22) Filed: May 11, 2015

(65) Prior Publication Data

US 2016/0337792 A1     Nov. 17, 2016

(51) Int. Cl.
| | |
|---|---|
| *H04W 36/00* | (2009.01) |
| *H04W 4/02* | (2009.01) |
| *G01S 5/02* | (2010.01) |
| *G01S 5/14* | (2006.01) |
| *H04L 12/26* | (2006.01) |
| *H04W 24/08* | (2009.01) |
| *H04W 48/18* | (2009.01) |

(52) U.S. Cl.
CPC ........... *H04W 4/023* (2013.01); *G01S 5/0205* (2013.01); *G01S 5/14* (2013.01); *H04L 43/0864* (2013.01); *H04W 24/08* (2013.01); *H04W 48/18* (2013.01)

(58) Field of Classification Search
CPC ..... H04W 24/10; H04W 4/023; H04W 24/02; H04W 64/003; H04W 64/00; H04W 28/0226; H04W 40/20; H04B 17/318

USPC .......................................................... 455/436
See application file for complete search history.

(56) References Cited

U.S. PATENT DOCUMENTS

| | | | |
|---|---|---|---|
| 9,326,096 B1* | 4/2016 | Gatmir-Motahari .... | H04W 4/02 |
| 2003/0216142 A1 | 11/2003 | Wigren et al. | |
| 2009/0323596 A1 | 12/2009 | Wigren et al. | |
| 2011/0269478 A1* | 11/2011 | Das .......................... | G01S 5/14 |
| | | | 455/456.1 |
| 2013/0143497 A1 | 6/2013 | Das et al. | |
| 2013/0235738 A1 | 9/2013 | Siomina et al. | |

(Continued)

FOREIGN PATENT DOCUMENTS

| | | |
|---|---|---|
| WO | WO-2012122573 A2 | 9/2012 |
| WO | WO-2015041708 A1 | 3/2015 |

OTHER PUBLICATIONS

International Search Report and Written Opinion—PCT/US2016/030938—ISA/EPO—Aug. 2, 2016.

*Primary Examiner* — Kwasi Karikari
(74) *Attorney, Agent, or Firm* — Silicon Valley Patent Group LLLP

(57) ABSTRACT

Systems, apparatus and methods for selecting a base station or a set of base stations for RTT measurements, or other interactive radio localization technique, to determine a position fix of a device are presented. The method imposes a processing load on only inactive or less active base stations. Busy or busier base stations are not used in the interactive radio localization technique. By imposing a processing load on only less active base stations, transmitting devices may be under loaded and encounter a more uniform processing delay, and thus provide a more accurate measurement resulting in a more accurate position fix.

31 Claims, 7 Drawing Sheets

(56) References Cited

U.S. PATENT DOCUMENTS

2014/0194137 A1   7/2014  Do et al.
2014/0295882 A1  10/2014  Guo et al.

* cited by examiner

BASE STATION SELECTION FOR POSITIONING/LOCALIZATION BASED ON AN INDICATION OF CAPACITY

BACKGROUND

I. Field of the Invention

This disclosure relates generally to systems, apparatus and methods for position location of devices, and more particularly to determining a position fix with radio measurements from base stations selected based on an indication of base station capacity.

II. Background

A satellite positioning system (SPS), such as the Global Positioning System (GPS), Galileo, and GLONASS, for example, typically provides position, velocity, and/or time information. In a particular implementation, an SPS may comprise a Global Navigation Satellite System (GNSS). A variety of receivers have been designed to decode signals transmitted from satellite vehicles (SVs) of an SPS to determine position, velocity, and/or time. In general, to decipher such signals and compute a final position, a receiver may first acquire signals from SVs that are in view, measure and track the received signals, and recover navigational data from the signals. By accurately measuring distances or "pseudoranges" to multiple SVs, a receiver may triangulate its position, e.g., solving for a latitude, longitude, and/or altitude. In particular, the receiver may measure distance by measuring the time that signals take to travel from a respective SV to the receiver.

In certain locations, such as indoor and urban environments with tall buildings, a receiver may only be able to acquire signals from three or fewer SVs. In such situations, the receiver may be unable to resolve all four variables of a position solution (including latitude, longitude, altitude, and time). If signals from fewer than four SVs are available, the receiver may be unable to calculate its position based on an SPS alone. To address such a limitation, receivers may employ non-SV positioning or hybrid location technology that involves signals from base station devices and/or access point devices of a wireless communication system. These receivers may measure times of wireless signals less processing delays to compute distances to base station devices and/or access point devices of a network.

In indoor environments, it may be desirable, and sometimes necessary, to know the location of a mobile device, terminal or cellular phone when SV signals are not available. The terms "location" and "position" are synonymous and are used interchangeably herein. For example, when indoors, a user may utilize the mobile device to browse through a website and may click on location sensitive content. The location of the mobile device may then be determined and used to provide appropriate content to the user. As another example, the user may place an emergency call using the mobile device. The location of the mobile device may then be determined and used to send emergency assistance to the user. There are many other scenarios in which knowledge of the location of the terminal is useful or necessary.

The indoor position of a mobile device may be estimated based on information gathered from various systems. Such systems may comprise a cellular network, a wireless wide access network (WWAN) communication system and/or a wireless local access network (WLAN) communication system comprising a number of base station devices or access point devices to support communications for a number of mobile devices. A position estimate for a mobile device may be obtained, for example, through triangulation or trilateration based on timing parameters such as round trip time signal delay, code phase detections, signal strength estimates, and/or other measurements obtained through communication with one or more base station devices or access point devices. A position estimate may be further based on known or reported locations of the base station devices and access point devices.

BRIEF SUMMARY

Disclosed are systems, apparatus and methods in a device, having an interactive radio localization capability, for position location. According to some aspects, disclosed is a method for use in a device having an interactive radio localization capability, the method comprising: transmitting a request message, to a transmitting device having a complementary interactive radio localization capability, based, at least in part, on an indication of operative capacity corresponding to the complementary interactive radio localization capability of the transmitting device; and receiving a response message, transmitted by the transmitting device in response to the request message.

According to some aspects, disclosed is a device having an interactive radio localization capability, the device comprising: a receiver; a transmitter; and a processor coupled to the receiver and the transmitter and configured to: initiate transmission of a request message via the transmitter and to a transmitting device having a complementary interactive radio localization capability, based, at least in part, on an indication of operative capacity corresponding to the complementary interactive radio localization capability of the transmitting device; and obtain a response message via the receiver and transmitted by the transmitting device in response to the request message.

According to some aspects, disclosed is a device having an interactive radio localization capability, the device comprising: means for transmitting a request message, to a transmitting device having a complementary interactive radio localization capability, based, at least in part, on an indication of operative capacity corresponding to the complementary interactive radio localization capability of the transmitting device; and means for receiving a response message, transmitted by the transmitting device in response to the request message.

According to some aspects, disclosed is a non-transient computer-readable storage medium, for a device using an interactive radio localization technique, including program code stored thereon, comprising program code configured to: transmit a request message, to a transmitting device having a complementary interactive radio localization capability, based, at least in part, on an indication of operative capacity corresponding to the complementary interactive radio localization capability of the transmitting device; and receive a response message, transmitted by the transmitting device in response to the request message.

BRIEF DESCRIPTION OF THE DRAWING

Embodiments of the invention will be described, by way of example only, with reference to the drawings.

DETAILED DESCRIPTION

Figure 1:
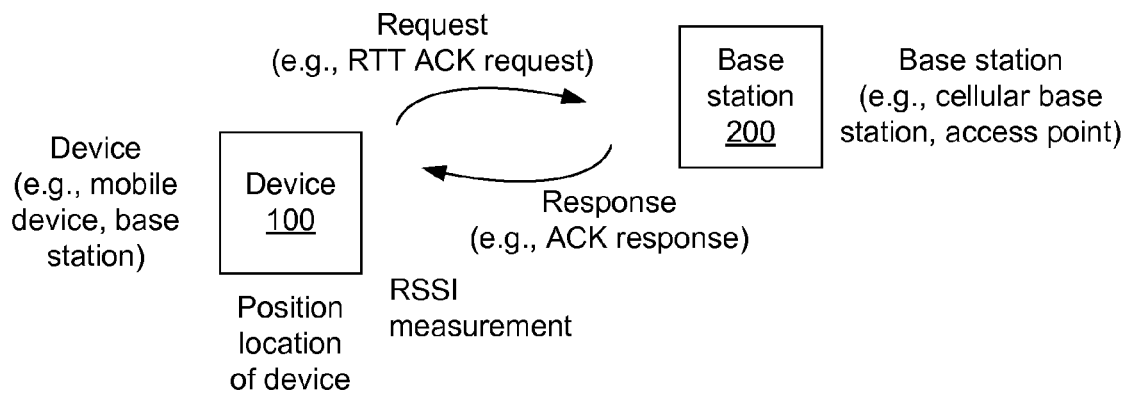
FIG. 1 illustrates a device communicating with a base station.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination (localization) techniques described herein may be implemented in conjunction with various wireless communication networks such as a WWAN, a WLAN, a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), $4^{th}$ Generation LTE (4G/LTE) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 illustrates a device 100 communicating messages with a base station 200. The device 100 and the base station 200 communicate interactive radio localization messages, such as a request message and a response message, which is likely to cause additional processing overhead on the base station 200. In this example, round-trip time (RTT) request and RTT response messages are use but various interactive radio localization techniques may be used, alone or in combination with other localization techniques, to determine a location of a mobile terminal.

Other interactive radio localization techniques include active techniques, such as System Frame Number (SFN-SFN) observed time difference, Connection Frame Number (CFN-SFN) observed time difference, Uplink Time (Difference) of Arrival, Downlink Observed Time Differences, Enhanced Observed Time Differences (E-OTD), Observed Time Difference of Arrival (OTDOA), Pilot Correlation, hybrid methods (such as AoA+RTT and OTDOA+AOA), Database Correlation, Signal Pattern Recognition (such as using a Hidden Markov model or a trained model), and other positioning techniques that require a base station 200 to perform a specific task.

Non-interactive radio localization techniques include passive techniques, such as Received Signal Code Power (RSCP), Received Signal Strength (RSS), Angle of Arrival (AoA), Cell Identification (ID) based methods, Enhanced Cell ID (E-CID), other Signal Strength methods, and other positioning techniques that do not require a base station 200 to perform a specific task.

With this in mind, a request message, such as, for example, an RTT acknowledgment (ACK) request message, may be transmitted by the device 100 to a base station 200 or other transmitting device with a complementary interactive radio localization capability, based, at least in part, on an indication of operative capacity corresponding to the complementary interactive radio localization capability of the transmitting device. Below an RTT ACK request massage is used in several examples but may be substituted with a generic request message, a message requesting a response, or another interactive message from an interactive radio localization technique.

A response message may be transmitted by the base station 200 to the device 100 after a predetermined delay (also referred to as a turn-around time, which may be specified in a standard to a set value). The predetermined delay includes a processing delay in the base station 200 of receiving a request message and preparing a response message, such as, for example, RTT ACK request and response messages, as well as measured, expected or known additional delays, such as, from general base station overhead. The predetermined delay often includes a variable or fixed delay resulting in a fixed predetermined delay. An overall delay as seen by the device 100 includes this predetermined delay as well as a variable round-trip signal traveling time. The round-trip signal traveling time may directly correspond to a variable round-trip distance between the device 100 and the base station 200. The device 100 may receive this response message, transmitted by the transmitting device in response to the request message.

In certain instances, the device 100 may comprise a mobile device, however, the device 100 may also be another base station, access point or the like. As used herein, it should be understood that the term "base station" is intended to broadly represent various types of electronic devices that transmit wireless signals in support of one or more interactive localization techniques. Thus, for example, base station 200 may represent an access point (AP) device, a cellular base station device, a femtocell device, a picocell device, a dedicated positioning beacon device, just to name a few examples. As part of an RTT positioning technique, the device 100 may measure an overall delay between sending an RTT ACK request and receiving an ACK response. Generally, the device 100 measures an overall delay based on a time between transmitting the request message and receiving the response message. This overall delay is reduced by a predetermined delay or a specified turn-around time of the base station 200 to result in a round-trip signal traveling time or a computed delay. This computed round-trip signal traveling time should represent twice the distance between an antenna of the device 100 and an antenna of the base station 200, assuming a line of sight transmission path. A burst of RTT ACK requests and ACK responses message pairs results in a corresponding number of computed delays, which may undergo further processing, such as, just to name a few examples, identifying and removing outliers, averaging, minimum delay detection, and/or other statistical processing, to result in a representative round-trip signal traveling time. A similar burst of RTT ACK request and ACK response messages may be transmitted by the device 100 to other base stations 200 to result in computed delays and hence distances to these other base stations 200. Distances to multiple base stations 200 may result in a position fix of the device 100. Using a single interactive radio localization technique. A combination of interactive radio localization techniques may require only one or two base stations 200. The distances to a base station 200 may be repeated at various times to result in new position fixes of the device 100.

Figure 2:
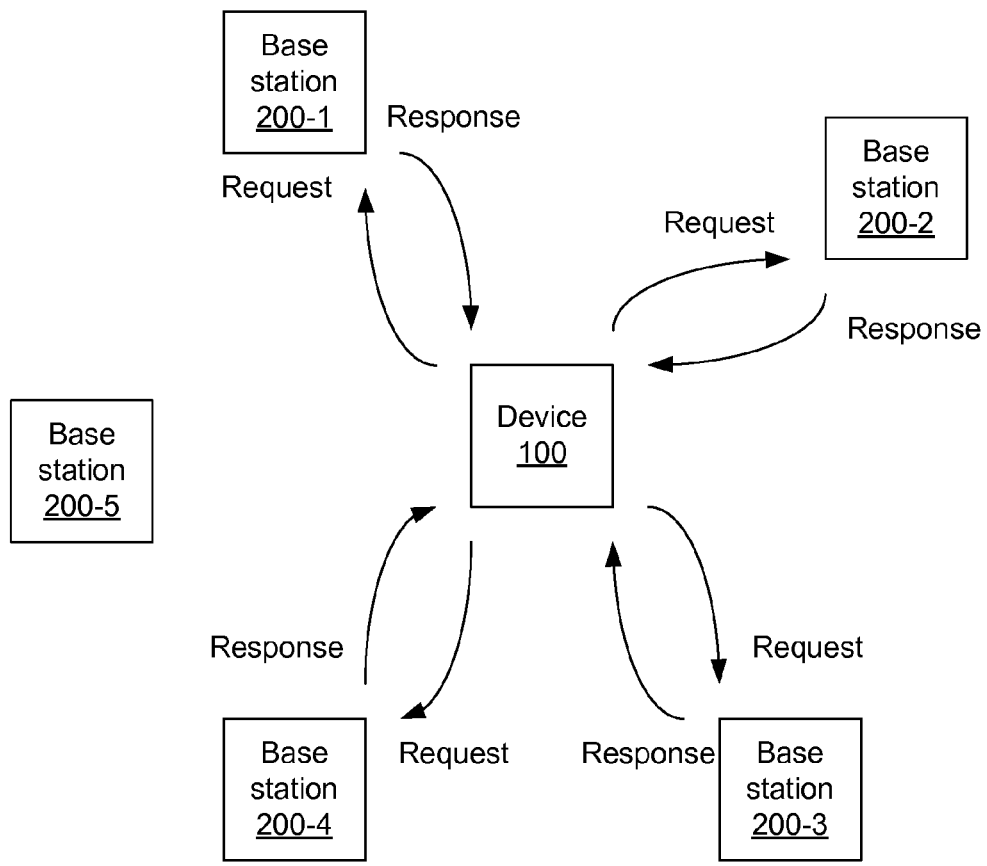
FIG. 2 illustrates a device communicating with several potential base stations.

FIG. 2 illustrates a device 100 communicating with several potential base stations (e.g., base stations 200-1, 200-2, 200-3, 200-4 and 200-5). In this example, base station 200-1 is busy. Base stations 200-2, 200-3 and 200-4 are strong and not busy. Base station 200-5 provides the device 100 with a weak signal.

Figure 4:
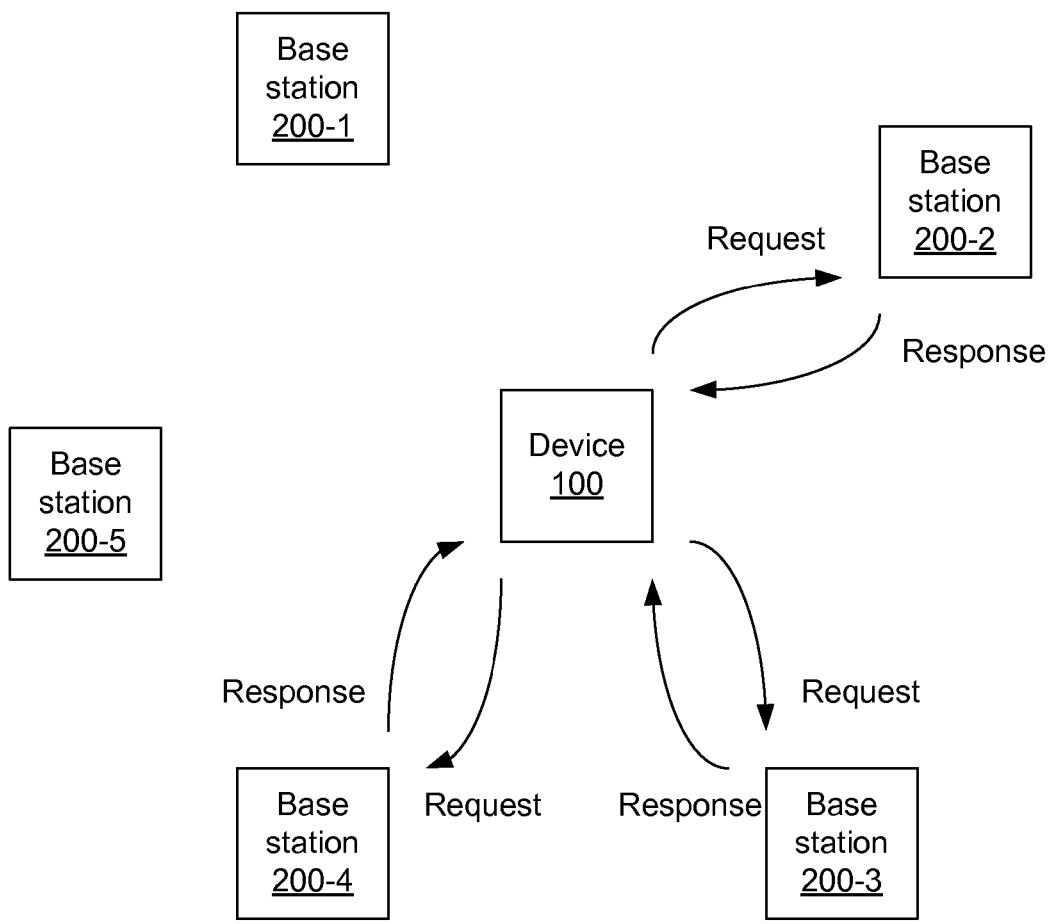
FIG. 4 illustrates a device communicating with several base stations, in accordance with some example embodiments.

A base station may be used to compute a position of the device 100. For example, RSSI or similar non-interactive measurements from all base stations (e.g., base stations 200-1, 200-2, 200-3, 200-4 and 200-5) or non-weak base stations (e.g., base stations 200-2, 200-3, 200-4 and 200-5) may be used to determine a position. Alternatively as shown in FIG. 2, interactive measurements from non-weak base stations (e.g., base stations 200-1, 200-2, 200-3 and 200-4) may be used to determine a position. Alternatively as shown in FIG. 4, interactive measurements from only non-weak, non-busy base stations (e.g., base stations 200-2, 200-3 and 200-4) may be used to determine a position. Alternatively, a combination of interactive measurements and non-interactive measurements may be used to determine a position of the device 100.

A busy base station is a base station (e.g., base station 200-1) that indicates it is at or nearing an operative capacity 300. A busy base station may be dropping request messages such that no response is heard in reply to the request message. In either case, messages from base station (such as base station 200-1) are too close to or not meeting a specified turn-around time, for example, as defined by a standard. This base station 200-1 may be considered not reliable enough to accept new a task of responding to a request message so is excluded from interactive measurements, such as RTT measurements.

Such base stations excluded from interactive measurements may still provide acceptable non-interactive measurements or passive measurements, such as from method using a received signal strength indicator (RSSI) technique and/or the like. Non-interactive measurements do not add an addition burden on a busy base station. For example, a base station at or nearing its capacity is considered a busy base station. An ACK response may be delayed more than the specified turn-around time and therefore the busy base station 200 may appear farther away from the device 100 than it actual is located. A passive measurement, such as an RSSI measurement, does not affect a busy base station and thus may be used without concern of over loading that base station.

In this example, the several base stations (base stations 200-2, 200-3 and 200-4) that are not at or near capacity (as indicated by an operative capacity 300) and also provide signals of sufficient signal strength (e.g., RSSI satisfying some threshold value, etc.) may be considered available for accurate RTT measurements. Assuming that base station 200-5 provides signals with too weak of an RSSI value, base station 200-5 is not considered available or preferred for RTT measurements or other interactive radio localization technique. Therefore, the device 100 may compute a position fix by using an interactive radio localization technique with non-busy, non-weak base stations (e.g., base stations 200-2, 200-3 and 200-4) and possibly also include a non-interactive radio localization technique with busy base stations (e.g., base station 200-1) even though a distance calculated with a non-interactive radio localization technique may be less accurate than a distance calculated with an interactive radio localization technique.

Figure 3:
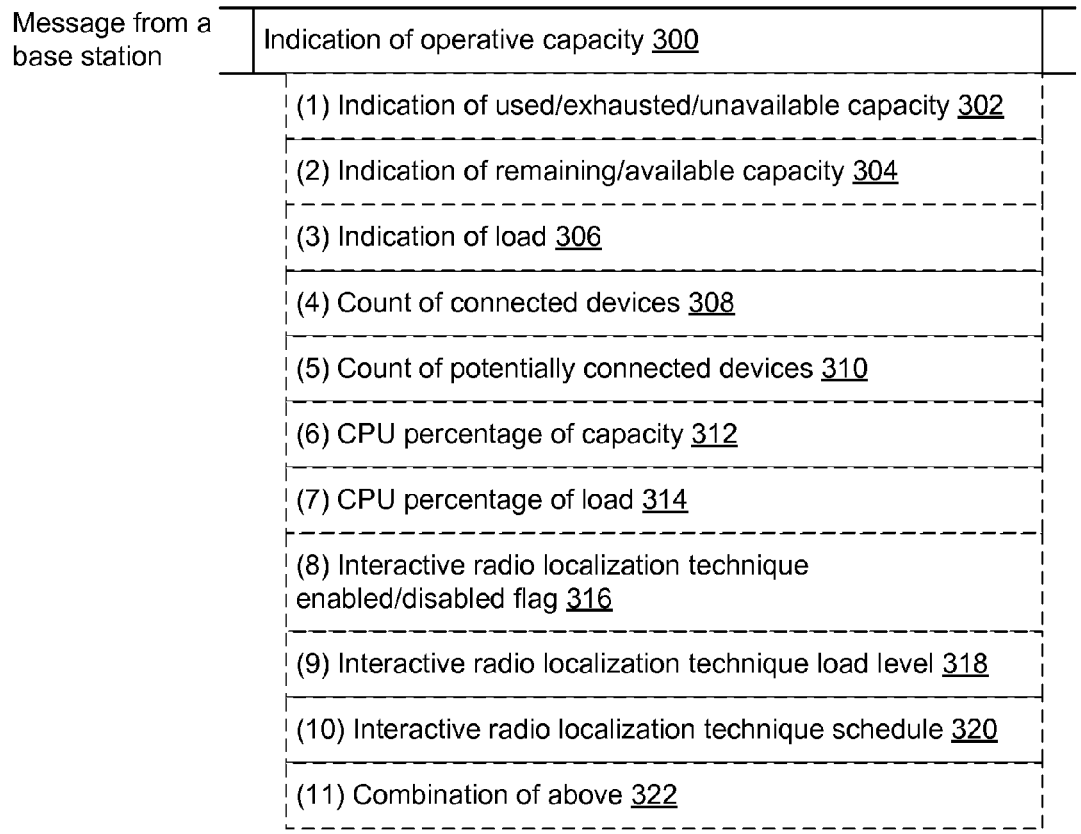
FIG. 3 shows a message, from a base station, with an indication of operative capacity corresponding to an interactive radio localization capability, in accordance with some example embodiments.

FIG. 3 shows a message, from a base station 200, with an indication of operative capacity 300 corresponding to an interactive radio localization capability, in accordance with some example embodiments. The operative capacity 300 may be based on or otherwise comprise an indication of a used/exhausted/unavailable capacity 302 and/or conversely may comprise an indication of a remaining/available capacity 304. The base station 200 may, for example, broadcast one or more overhead messages, transmit one or more point-to-point or point-to-multipoint messages, and/or the like or some combination thereof.

A transmitted message from a base station 200 may, in certain instances, include one or more indications of operative capacity 300. As may be appreciated, an indication of operative capacity 300 may take several forms. For example, the indication of operative capacity 300 may comprise or otherwise be based, at least in part, on one or more parameters, such as: (1) an indication of used/exhausted/unavailable capacity 302; (2) an indication of remaining/available capacity 304; (3) an indication of load 306; (4) a count of connected devices 308; (5) a count of potentially connected devices 310; (6) a CPU percentage of capacity 312; (7) a CPU percentage of load 314; (8) an interactive radio localization technique enabled/disabled flag 316; (9) an interactive radio localization technique load level 318; (10) an interactive radio localization technique schedule 320; and/or (11) a combination of such parameters 322, or the like.

Again, RTT is used herein as an example of an interactive radio localization technique for which an indication of an operative capacity 300 relating to a base station 200 may be considered while selecting one of more base stations for an interactive radio localization technique and/or while selecting one of more base stations for a non-interactive radio localization technique. As mentioned, it should be recognized that many of the example indications of operative capacity 300 and/or corresponding parameters presented herein may be have converse indications of operative capacity 300 and/or corresponding parameters that may be used instead. For example, an indication of "available capacity" may have a converse indication of "unavailable capacity", either of which may in certain instances prove informative as to a determination whether a corresponding a base station 200 may or may not be selected for interactive positioning and/or a base station 200 may or may not be selected for non-interactive positioning. By way of example, in certain instances, either an "available capacity" of 25%, or the converse "unavailable capacity" of 75%, may be equally informing for such decisions. Of course, this is just another example and claimed subject matter is not intended to be so limited.

With this in mind, by way of example, an indication of load 306 may indicate a capacity and/or bandwidth being used (or the converse). A count of connected devices 308 may indicate a number of mobile devices being presently serviced by the base station 200 (or the converse, e.g., a number of openings for additional mobile devices). The count of potentially connected devices 310 indicates a number of mobile devices within a service (coverage) area of the base station 200. The CPU percentage of capacity 312 and the CPU percentage of load 314 represent a level in CPU cycles, a percentage from 0% to 100%, or the like.

The interactive radio localization technique enabled/disabled flag 316 indicates whether the interactive radio localization technique is enabled or disabled. For example, the interactive radio localization technique enabled/disabled flag 316 may be an RTT flag indicating if RTT is enabled on this base station 200.

The interactive radio localization technique load level 318, such as an RTT load level, indicates a general level such that several specific values are consolidated into each category (e.g., low, medium or high). For example, a device 100 may select base stations 200 with a low interactive radio localization technique load level 318, such as a low RTT load level. If a device 100 is unable to find a sufficient number of base stations 200 having a low RTT load level, the device 100 may include additional base stations 200 with a next higher RTT load level until a sufficient number of base stations 200 or a predetermined threshold of base stations 200 have been selected. Again, this RTT method is used herein as an example of an interactive radio localization technique.

The interactive radio localization technique schedule 320 includes a schedule of future times and expected operative capacity 300 for those times. For example, an interactive radio localization technique schedule 320, such as an RTT schedule, may indicate an expected capacity or load for each hour and each day of an upcoming week.

FIG. 4 illustrates a device communicating with several base stations (e.g., base stations 200-2, 200-3 and 200-4), in accordance with some example embodiments. Each base station 200 sends an overhead, point-to-point or point-to-multipoint message including an indication of operative capacity 300.

In this example, the device 100 or the base station 200-1 determine whether the base station 200-1 is too busy and/or a sufficient number of less busy base stations (e.g., base stations 200-2, 200-3 and 200-4) already exists to determine a position of the device 100 with sufficient accuracy. The base stations 200-2, 200-3 and 200-4 each transmit a message including an indication of operative capacity 300 of the respective base station. Each operative capacity 300 may indicate that the base station is available for RTT measurements. That is, the device 100 receives a message from each base station 200 or each strong base station 200 indicating the operative capacity 300 of that particular base station 200.

In this case, the device 100 takes RSSI measurement of signals from each base station 200, including base station 200-5, to determine if a base station 200 is too weak for RTT ACK request messages or other interactive messages. For interactive base stations 200, the device 100 may measure an overall delay or a RTT delay from a time difference between an RTT ACK request message and an ACK response message, and compute a round-trip signal travel time or distance to each interactive base station 200. The round-trip signal travel times from base stations 200-2, 200-3 and 200-4, and possibly RSSI measurements from base station 200-1 may be used to determine a position fix of the device 100.

In this manner, a non-weak but busy base station 200-1 may be excluded from RTT processing or other interactive radio localization processing. By throttling processing on a busy base station 200-1 or not imposing an additional burden on a busy base station 200-1, a device 100 may assist in load balancing base station processing.

Figure 5:
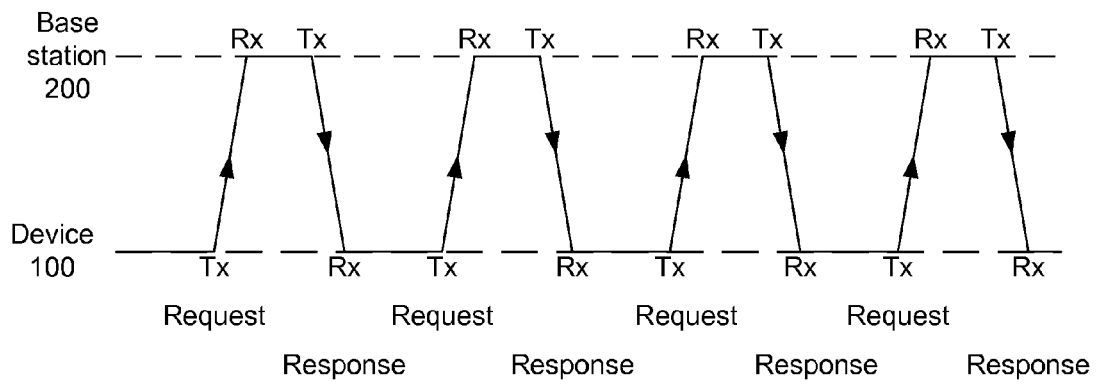
FIGS. 5-7 show bursts of messages used for ranging from a device to a base station, in accordance with some example embodiments.
Figure 6:
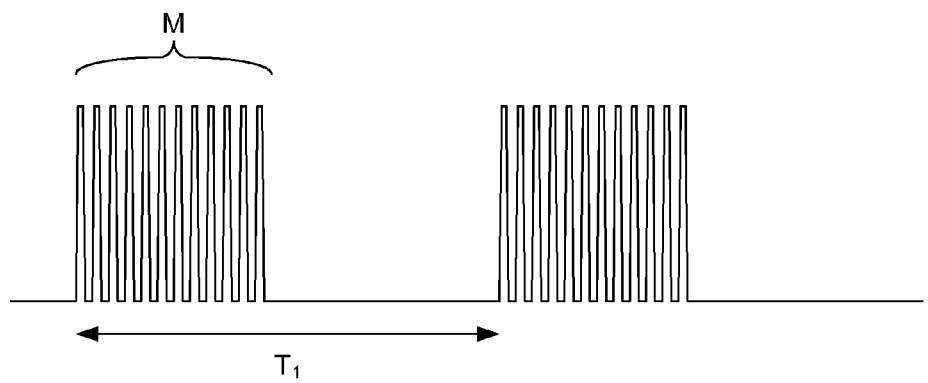
Figure 7:
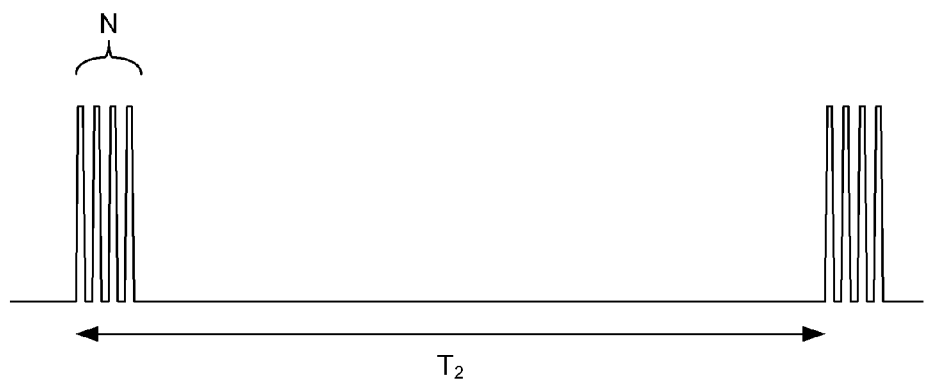

FIGS. 5-7 show bursts of messages used for ranging from a device 100 to a base station 200, in accordance with some example embodiments. In FIG. 5, a series of RTT ACK requests are transmitted from a device 100 and received by a base station 200. In response, a corresponding series of ACK responses are transmitted by the base station 200 and received at the device 100. The pairs of request and response messages may be communicated in a burst fashion to each base station 200 selected for RTT measurements.

In FIG. 6, two bursts are shown. The bursts may be characterized by a count of M pairs in each burst and a period of $T_1$ from the begin of a burst to the beginning of the next burst. Similarly, in FIG. 7, two additional bursts are shown. The bursts may be characterized by a count of N pairs in each burst and a period of $T_2$ from the begin of a burst to the next burst. If a base station 200 is moderately busy but usable for RTT measurement, the device 100 may reduce the count M to a lower count N. Alternatively or in addition to, the device 100 may increase period of from $T_1$ to period of $T_2$. Thus, the device 100 may use RTT measurement from a moderately busy base station 200. In this manner, the device 100 reduces its impact on the moderately busy base station 200 by decreasing the number of bursts and/or increasing the period between bursts.

Figure 8:
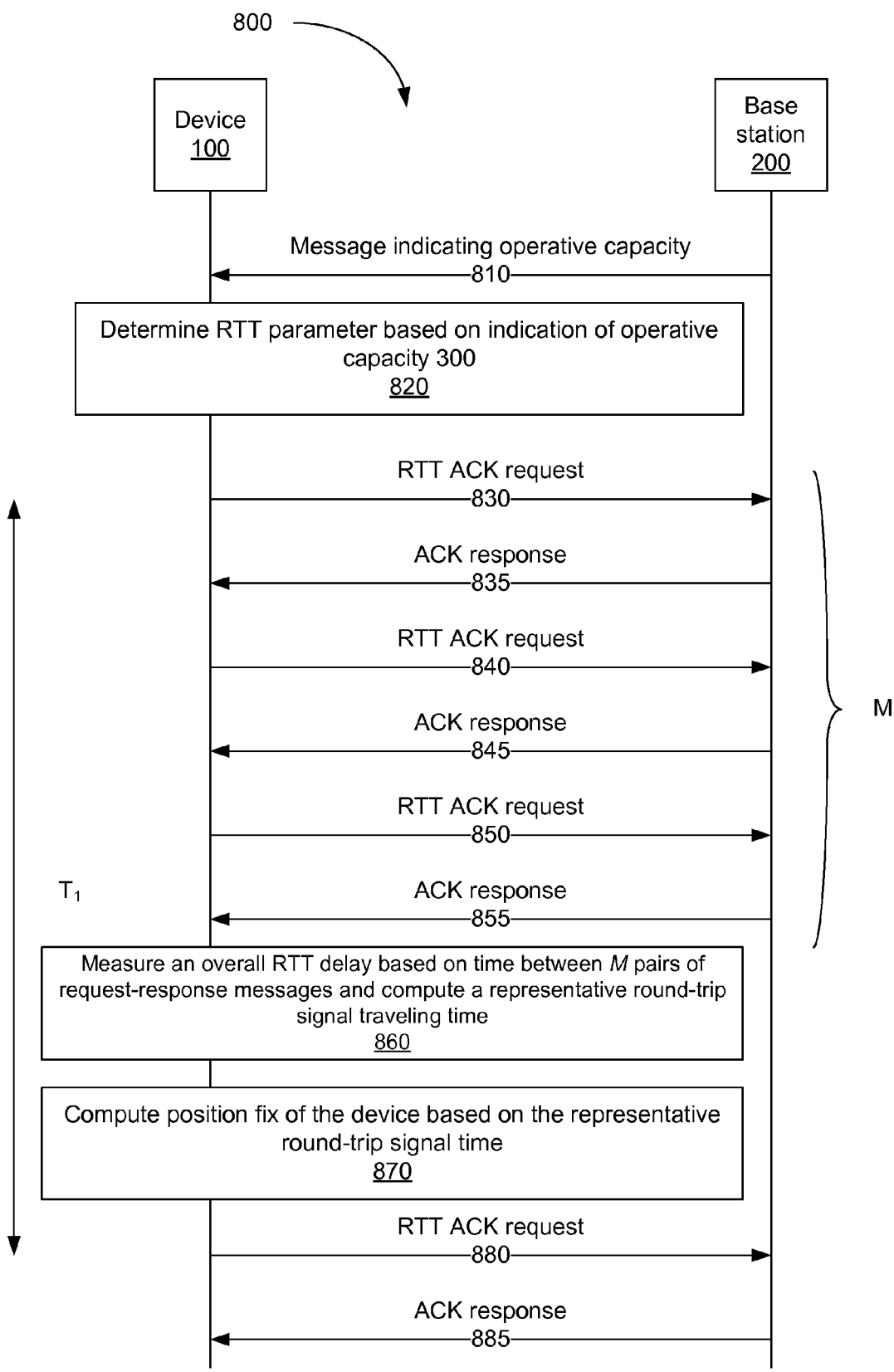
FIGS. 8-9 show methods for selecting one or more base stations for interactive radio localization based, at least in part, on a corresponding indication of operative capacity from each base station, in accordance with some example embodiments.
Figure 9:
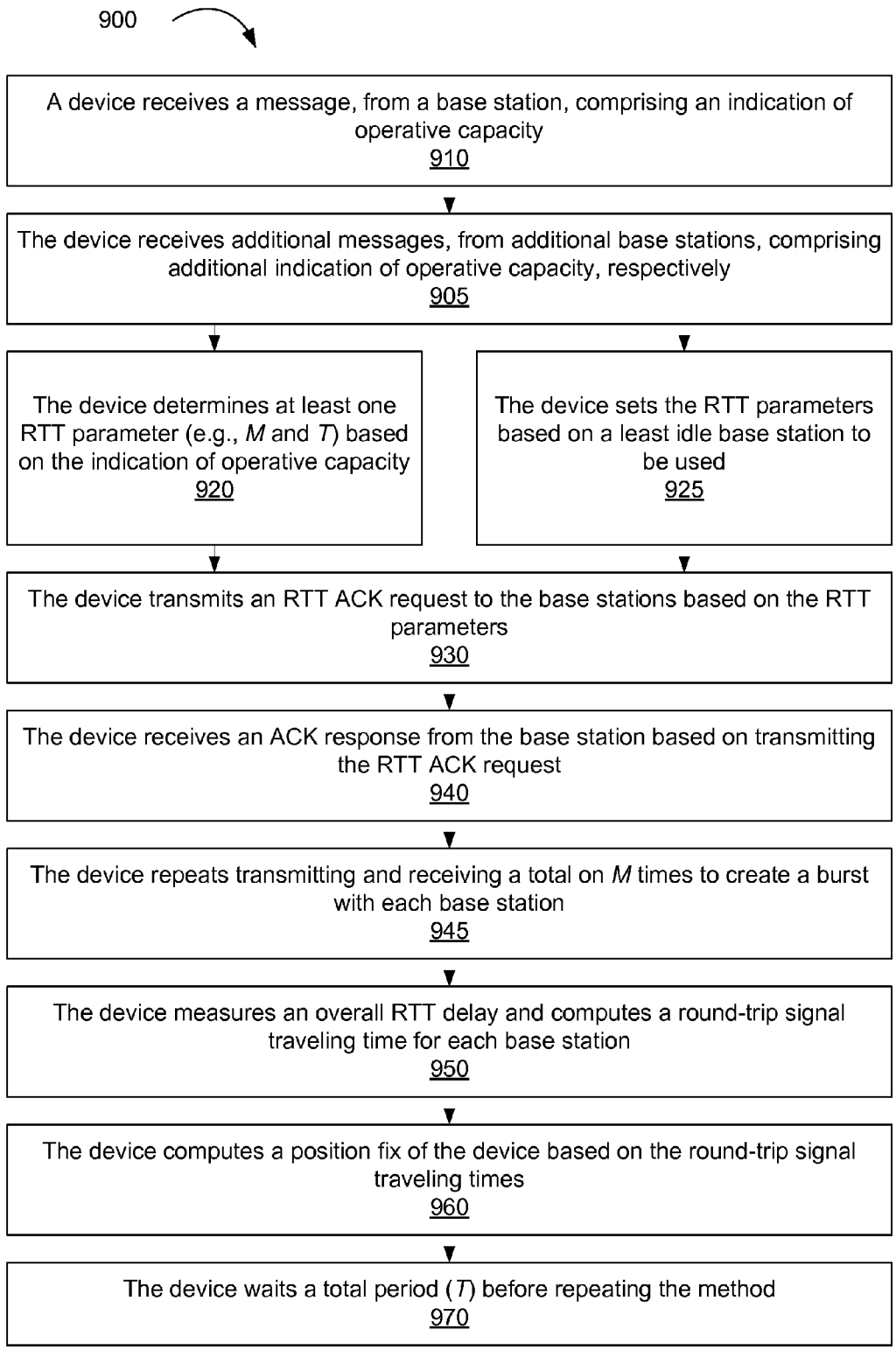

FIGS. 8-9 show methods for selecting one or more base stations 200 for interactive radio localization based, at least in part, on a corresponding indication of operative capacity 300 from each base station 200, in accordance with some example embodiments.

In FIG. 8, a method 800 shows a device 100 and a base station 200 communicating and processing RTT messages. At 810, the base station 200 sends a message that includes an indication of operative capacity 300. A device 100 receives this message and at 820, determines at least one parameter, such as an RTT parameter, based on the indication of operative capacity 300. For example, the RTT parameter may be derived and include at least one of: (1) an enable/disable interactive radio localization flag; (2) an enable/disable burst flag; (3) a count of request-response pairs per burst; (4) a frequency of bursts; (5) an interactive radio localization schedule; or (6) a combination thereof. Alternatively, the indication of operative capacity 300 explicitly includes the parameter. In either case, the indication of operative capacity 300 indicates the parameter either implicitly or explicitly.

When the interactive radio localization technique includes RTT processing, a RTT parameter may include: (1) a parameter to enable or disable RTT measurements for this base station 200, as shown in this example; (2) a parameter to enable or disable bursts; (3) a count of M request-response pairs per burst; (4) a period $T_1$ between starts of bursts; (5) expected load or capacity in an RTT schedule; or (6) a combination thereof.

Assuming RTT measurement and bursts are both enabled for communication with a particular base station 200, at 830, 840 and 850, the device 100 sends a sequence of RTT ACK requests a total of M times. At 835, 845 and 855, the base station 200 sends back a corresponding sequence of MACK responses.

At 860, the device 100 measures an overall RTT delay between each of M pairs of request-response messages. The overall RTT delay may be used to compute a round-trip signal traveling time. That is, the overall RTT delay for each pair of messages may be reduced by a fixed turn-around time and may undergo further processing, such as, just to name a few examples, identifying and removing outliers, averaging, minimum delay detection, and/or other statistical processing, to result in a representative round-trip signal traveling time.

At 870, the device 100 computes a position fix of the device 100 based on the representative round-trip signal traveling time from several selected base stations 200. The device 100 may compute a position fix using a hybrid solution of interactive techniques and non-interactive techniques. For example, the device 100 may make RTT measurements (or similar interactive measurements) measured from one or more non-busy, non-weak base stations 200 and also RSSI values (or similar non-interactive measurements) measured from one or more base stations 200. The non-interactive measurements may be from only busy base stations 200, non-weak base stations 200, busy and/or non-weak base stations 200, or all base stations 200. At 880 and 885, the burst process begins again after a waiting period $T_1$ between initial RTT ACK request messages.

In FIG. 9, a method 900 shows various steps performed in a device 100. At 910, a device 100 receives a message, from a base station 200, comprising an indication of operative capacity 300. Alternatively, the device 100 determined the base station 200 is busy, for example, based on dropped request messages. At 905, the device 100 optionally receives additional messages, from additional base stations 200, each comprising additional indications of operative capacity 300 in the respective base station 200.

In some circumstances, a particular base station 200 may be excluded from RTT measurements or measurements for another interactive radio localization technique. For example, the device 100 may receive a first message, from a first base station 200, comprising a first indication of operative capacity 300 of that first base station 200. The device 100 then may receive a second message, from a second base station 200, comprising a second indication of operative capacity 300 of that second base station 200. The device 100 may determine not to transmit to the second base station 200 based on the second indication of operative capacity 300. The indications of operative capacity show the first base station 200 is not too busy for responding to request messages or other interactive radio localization technique but the second base station 200 is too busy an thus is limited to a non-interactive radio localization technique.

At 920, the device 100 determines at least one parameter (e.g., RTT parameter(s) such as M and/or T) for each base station 200 based on the indication of operative capacity 300 received from each base station 200. Alternatively, the device 100 reads the at least one parameter from the indication of operative capacity 300 received. Alternatively, the device 100 sets the at least one parameter based on an earlier failure, such as a dropped request message.

Alternatively, as shown in 925, the device 100 sets the parameters based on the "most idle" base stations 200 to be used. The most idle base stations 200 may be selected as those base stations below a threshold or a predetermined number of base stations 200. For example, the device 100 may sort transmitting devices in a list based on the indication of operative capacity for each of the transmitting devices and selecting a fixed number or a number of the least busy base stations. A device 100 computing a position fix of the device 100 may compute the position fix of the device based on the first base stations in the list and ignoring busier transmitting device.

At 930, the device 100 transmits one or more RTT ACK requests, or similar request for another interactive radio localization technique, to the base stations 200 based on the indication of operative capacity 300 for strong base stations 200. At 940, the device 100 receives a corresponding one or more ACK responses from the base station 200 based on transmitting the one or more ACK requests. If burst mode is used, at 945, the device 100 continues and repeats transmitting and receiving a total on M times to create a separate burst with each base station 200.

At 950, the device 100 uses an interactive radio localization technique, such as measuring an overall RTT delay and computing a round-trip signal traveling time for each base station 200 or computing the distance to a base station 200. At 960, the device 100 computes a position fix of the device 100 based, at least in part, on the round-trip signal traveling time (such as the representative round-trip signal traveling time) or the distance to each base station 200.

Alternatively, the device 100 also measures a non-interactive radio localization measurements, such as RSSI measurements, from non-weak but busy base stations (e.g., base station 200-1) or busy or weak base stations (e.g., base station 200-1 and 200-5). At 960, the device 100 computes a position fix of the device 100 based, at least in part, on the round-trip signal traveling time (such as the representative round-trip signal traveling time) and the non-interactive radio localization measurement, such as the RSSI measurements. At 970, the device 100 waits a total period (T) before repeating method 900.

Figure 10:
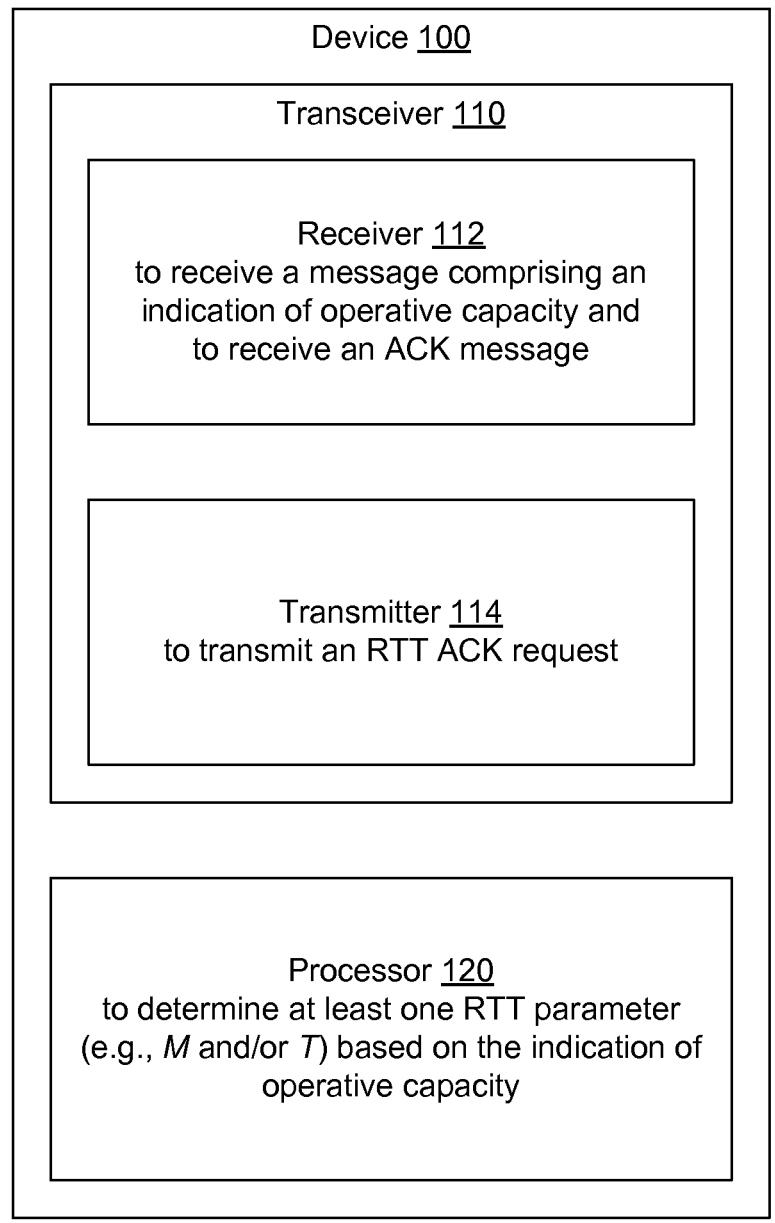
FIG. 10 shows a device that may be used to select one or more base stations for positioning, in accordance with some example embodiments.

FIG. 10 shows a device 100 that may be used to select one or more base stations 200 for positioning, in accordance with some example embodiments. The device 100 includes a transceiver 110 and a processor 120. The transceiver 110 includes a receiver 112 and a transmitter 114. The receiver 112 may act as a means for receiving a message, from a base station 200 or other transmitting device where the message comprising the indication of operative capacity 300, and may act as a means for receiving a response message, transmitted by the transmitting device in response to a request message. The transmitter 114 may act as a means for transmitting the request message to the transmitting device having a complementary interactive radio localization capability, based, at least in part, on an indication of operative capacity 300 corresponding to the complementary interactive radio localization capability of the transmitting device. The request message may comprise an RTT ACK request and the response message may comprise an RTT ACK response. The processor 120 may act as a means for determining the indication of operative capacity 300.

The processor 120 may also act as a means for measuring an overall delay based on a time between transmitting the request message and receiving the response message, a means for determining a round-trip signal traveling time based on the overall delay, and a means for computing a position fix of the device based, at least in part, on the round-trip signal traveling time.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for use in a device having an interactive radio localization capability, the method comprising: transmitting a request message, to a transmitting device having a complementary interactive radio localization capability, based, at least in part, on an indication of operative capacity corresponding to the complementary interactive radio localization capability of the transmitting device, wherein the indication of operative capacity indicates at least one of: a count of devices connected to the transmitting device, a count of devices in a coverage area of the transmitting device, or both; and receiving a response message, transmitted by the transmitting device in response to the request message.

2. The method of claim 1, further comprising receiving a message, from the transmitting device the message comprising the indication of operative capacity.

3. The method of claim 1, further comprising determining the indication of operative capacity.

4. The method of claim 1, wherein the request message comprises a round-trip time (RTT) ACK request and the response message comprises an RTT ACK response.

5. The method of claim 1, wherein the indication of operative capacity indicates at least one of: an enable/disable interactive radio localization flag; an enable/disable burst flag; a count of request-response pairs per burst; a frequency of bursts; or an interactive radio localization schedule.

6. The method of claim 1, further comprising: measuring an overall delay based on a time between transmitting the request message and receiving the response message; determining a round-trip signal traveling time based on the overall delay; and computing a position fix of the device based, at least in part, on the round-trip signal traveling time.

7. The method of claim 6, further comprising: sorting transmitting devices in a list based on the indication of operative capacity for each of the transmitting devices, wherein the transmitting devices comprises the transmitting device, and wherein the indication of operative capacity for each of the transmitting devices comprises the indication of operative capacity; wherein computing the position fix of the device comprises computing the position fix of the device based on the list and ignoring a second transmitting device, wherein the second transmitting device is busy.

8. The method of claim 6, wherein computing the position fix of the device comprises computing the position fix of the device based on an interactive radio localization technique with the transmitting device and a non-interactive radio localization technique with a second transmitting device.

9. The method of claim 8, wherein the interactive radio localization technique comprises a round-trip time (RTT) technique and the non-interactive radio localization technique comprises a received signal strength indicator (RSSI) technique.

10. The method of claim 1, wherein the device comprises a mobile device and the transmitting device comprises a base station.

11. A device having an interactive radio localization capability, the device comprising: a receiver; a transmitter; and a processor coupled to the receiver and the transmitter and configured to: initiate transmission of a request message via the transmitter and to a transmitting device having a complementary interactive radio localization capability, based, at least in part, on an indication of operative capacity corresponding to the complementary interactive radio localization capability of the transmitting device, wherein the indication of operative capacity indicates at least one of: a count of devices connected to the transmitting device, a count of devices in a coverage area of the transmitting device, or both; and obtain a response message via the receiver and transmitted by the transmitting device in response to the request message.

12. The device of claim 11, wherein the processor is further configured to obtain a message via the receiver and from the transmitting device the message comprising the indication of operative capacity.

13. The device of claim 11, wherein the processor is further configured to determine the indication of operative capacity.

14. The device of claim 11, wherein the request message comprises a round-trip time (RTT) ACK request and the response message comprises an RTT ACK response.

15. The device of claim 11, wherein the indication of operative capacity indicates at least one of: an enable/disable interactive radio localization flag; an enable/disable burst flag; a count of request-response pairs per burst; a frequency of bursts; or an interactive radio localization schedule.

16. The device of claim 11, wherein the processor is further configured to: measure an overall delay based on a time between transmitting the request message and receiving the response message; determine a round-trip signal traveling time based on the overall delay; sort transmitting devices in a list based on the indication of operative capacity for each of the transmitting devices, wherein the transmitting devices comprises the transmitting device, and wherein the indication of operative capacity comprises the indication of operative capacity; and compute a position fix of the device based, at least in part, on the round-trip signal traveling time and ignoring a second transmitting device, wherein the second transmitting device is busy.

17. The device of claim 11, wherein the device comprises a mobile device and the transmitting device comprises a base station.

18. A device having an interactive radio localization capability, the device comprising:
  a transmitter for transmitting a request message, to a transmitting device having a complementary interactive radio localization capability, based, at least in part, on an indication of operative capacity corresponding to the complementary interactive radio localization capability of the transmitting device, wherein the indication of operative capacity indicates at least one of: a count of devices connected to the transmitting device, a count of devices in a coverage area of the transmitting device, or both; and
  a receiver for receiving a response message, transmitted by the transmitting device in response to the request message.

19. The device of claim 18, wherein the receiver is further configured to receive a message, from the transmitting device the message comprising the indication of operative capacity.

20. The device of claim 18, further comprising a processor for determining the indication of operative capacity.

21. The device of claim 18, wherein the request message comprises a round-trip time (RTT) ACK request and the response message comprises an RTT ACK response.

22. The device of claim 18, wherein the indication of operative capacity indicates at least one of: an enable/disable interactive radio localization flag; an enable/disable burst flag; a count of request-response pairs per burst; a frequency of bursts; or an interactive radio localization schedule.

23. The device of claim 18, further comprising:
  a processor for measuring an overall delay based on a time between transmitting the request message and receiving the response message,
  for determining a round-trip signal traveling time based on the overall delay, for sorting transmitting devices in a list based on the indication of operative capacity for each of the transmitting devices, wherein the transmitting devices comprises the transmitting device, and wherein the indication of operative capacity for each of the transmitting devices comprises the indication of operative capacity, and for computing a position fix of the device based, at least in part, on the round-trip signal traveling time and ignoring a second transmitting device, wherein the second transmitting device is busy.

24. The device of claim 18, wherein the device comprises a mobile device and the transmitting device comprises a base station.

25. A non-transient computer-readable storage medium, for a device using an interactive radio localization technique, including program code stored thereon, comprising program code configured to: transmit a request message, to a transmitting device having a complementary interactive radio localization capability, based, at least in part, on an indication of operative capacity corresponding to the complementary interactive radio localization capability of the transmitting device, wherein the indication of operative capacity indicates at least one of: a count of devices connected to the transmitting device, a count of devices in a coverage area of the transmitting device, or both; and receive a response message, transmitted by the transmitting device in response to the request message.

26. The non-transient computer-readable storage medium of claim 25, wherein the program code is further configured to receive a message, from the transmitting device the message comprising the indication of operative capacity.

27. The non-transient computer-readable storage medium of claim 25, wherein the program code is further configured to determine the indication of operative capacity.

28. The non-transient computer-readable storage medium of claim 25, wherein the request message comprises a round-trip time (RTT) ACK request and the response message comprises an RTT ACK response.

29. The non-transient computer-readable storage medium of claim 25, wherein the indication of operative capacity indicates at least one of: an enable/disable interactive radio localization flag; an enable/disable burst flag; a count of request-response pairs per burst; a frequency of bursts; or an interactive radio localization schedule.

30. A method for use in a device having an interactive radio localization capability, the method comprising: transmitting a request message, to a transmitting device having a complementary interactive radio localization capability, based, at least in part, on an indication of operative capacity corresponding to the complementary interactive radio localization capability of the transmitting device, wherein the indication of operative capacity indicates at least one of: an enable/disable interactive radio localization flag, an enable/disable burst flag, a count of request-response pairs per burst, a frequency of bursts, or an interactive radio localization schedule; and receiving a response message, transmitted by the transmitting device in response to the request message.

31. A device having an interactive radio localization capability, the device comprising: a receiver; a transmitter; and a processor coupled to the receiver and the transmitter and configured to: initiate transmission of a request message via the transmitter and to a transmitting device having a complementary interactive radio localization capability, based, at least in part, on an indication of operative capacity corresponding to the complementary interactive radio localization capability of the transmitting device, wherein the indication of operative capacity indicates at least one of: an enable/disable interactive radio localization flag, an enable/disable burst flag, a count of request-response pairs per burst, a frequency of bursts, or an interactive radio localization schedule; and obtain a response message via the receiver and transmitted by the transmitting device in response to the request message.

* * * * *